(12) United States Patent
Tripier et al.

(10) Patent No.: US 9,580,628 B2
(45) Date of Patent: Feb. 28, 2017

(54) FIBROUS MATERIAL FOR HEAT-SEALING PACKAGING SUITABLE FOR MEDICAL USE

(71) Applicant: Arjowiggins Healthcare, Amelie-les-Bains (FR)

(72) Inventors: Michel Tripier, Voiron (FR); Christophe Simon, Maureillas las Illas (FR); Jean-Christophe Ricatte, Amelie-les-Bains (FR)

(73) Assignee: ARJOWIGGINS HEALTHCARE, Amelie-les-Bains (FR)

( * ) Notice: Subject to any disclaimer, the term of this patent is extended or adjusted under 35 U.S.C. 154(b) by 130 days.

(21) Appl. No.: 13/894,695

(22) Filed: May 15, 2013

(65) Prior Publication Data

US 2013/0252496 A1 Sep. 26, 2013

Related U.S. Application Data

(63) Continuation of application No. PCT/IB2011/055075, filed on Nov. 14, 2011.

(30) Foreign Application Priority Data

Nov. 15, 2010 (FR) ...................................... 10 59373

(51) Int. Cl.
*C09J 7/04* (2006.01)
*C09J 175/04* (2006.01)
(Continued)

(52) U.S. Cl.
CPC ............ *C09J 7/043* (2013.01); *B05D 3/0254* (2013.01); *C09J 175/04* (2013.01); *D21H 17/34* (2013.01);
(Continued)

(58) Field of Classification Search
CPC .. B05D 3/0254; C08G 2170/80; C09J 175/04; C09J 7/043; D21H 17/34;
(Continued)

(56) References Cited

U.S. PATENT DOCUMENTS 3,767,040 A * 10/1973 Tushaus ........................ 428/352
4,724,961 A 2/1988 Shimoyamada et al.
(Continued)

FOREIGN PATENT DOCUMENTS

EP 0528874 A1 3/1993
FR 2872493 A1 1/2006
(Continued)

OTHER PUBLICATIONS

French Search Report and Written Opinion dated Apr. 18, 2011 for application FR1059373.
(Continued)

*Primary Examiner* — Arti Singh-Pandey
(74) *Attorney, Agent, or Firm* — Jones Robb, PLLC (57) ABSTRACT

The invention relates to a fibrous material for heat-sealable medical packaging comprising a nonwoven fibrous single-layer substrate or a paper impregnated to the core by at least one polyurethane, at least one tackifier and optionally at least one functional additive. It also relates to the process for manufacturing this fibrous material, to the sizing composition used in the manufacturing process and to the medical packaging comprising such a fibrous packaging material.

15 Claims, 2 Drawing Sheets

(51) Int. Cl.
*D21H 17/34* (2006.01)
*D21H 17/37* (2006.01)
*D21H 17/57* (2006.01)
*D21H 21/18* (2006.01)
*D21H 27/10* (2006.01)
*B05D 3/02* (2006.01)

(52) U.S. Cl.
CPC ........... *D21H 17/37* (2013.01); *D21H 17/375* (2013.01); *D21H 17/57* (2013.01); *D21H 21/18* (2013.01); *D21H 27/10* (2013.01); *C08G 2170/80* (2013.01); *Y10T 428/2826* (2015.01); *Y10T 442/2746* (2015.04)

(58) Field of Classification Search
CPC ...... D21H 17/37; D21H 17/375; D21H 17/57; D21H 21/18; D21H 27/10; Y10T 428/2826; Y10T 442/2746
USPC ........ 427/389.9; 428/349; 442/150; 524/590
See application file for complete search history.

(56) References Cited

U.S. PATENT DOCUMENTS

| | | |
|---|---|---|
| 5,486,570 A | 1/1996 | St. Clair |
| 6,059,112 A | 5/2000 | Dykstra et al. |
| 6,063,498 A | 5/2000 | Licht et al. |
| 6,808,691 B1 | 10/2004 | Herve et al. |
| 2007/0054117 A1* | 3/2007 | Katchko .................. B32B 7/12 428/346 |
| 2007/0107381 A1 | 5/2007 | Vanhamel et al. |
| 2007/0246377 A1 | 10/2007 | Paris-Jolly et al. |
| 2010/0272938 A1 | 10/2010 | Mitchell et al. |

FOREIGN PATENT DOCUMENTS

| | | |
|---|---|---|
| JP | 2010255173 A | 11/2010 |
| WO | 9824970 A1 | 6/1998 |
| WO | 9900244 A1 | 1/1999 |
| WO | 9932044 A1 | 7/1999 |
| WO | 9948433 A1 | 9/1999 |
| WO | 0075210 A1 | 12/2000 |
| WO | 03086877 A2 | 10/2003 |
| WO | 2007079071 A1 | 7/2007 |

OTHER PUBLICATIONS

International Search Report for PCT/IB2011/055075.
Japanese Office Action with a mailing date of May 11, 2015 issued for corresponding Japanese patent application No. 2013-538318. Cited reference JP2010255173A is the equivalent of US2010272938A1.

* cited by examiner

FIBROUS MATERIAL FOR HEAT-SEALING PACKAGING SUITABLE FOR MEDICAL USE

CROSS REFERENCE TO RELATED APPLICATIONS

This application is a continuation of PCT Patent Application No. PCT/IB2011/055075, titled "FIBROUS MATERIAL FOR HEAT-SEALING PACKAGING SUITABLE FOR MEDICAL USE," filed Nov. 14, 2011, which claims priority to French patent application Ser. No. 10/59,373 with the same title and a filing date of Nov. 15, 2010, which is herein incorporated by reference.

FIELD OF INVENTION

The present invention relates to porous materials having a heat-sealing property, which are of use for preparing packaging in the medical field, in particular resistant to sterilization. These materials, in particular in the form of films, fabrics or papers, which are in particular nonwoven and fibrous, are in particular of use for forming packaging for medical instruments and equipment requiring sterilization. Such medical instruments may in particular be syringes, implants, valves, suture kits, inter alia.

BACKGROUND

The sterilization operation is typically carried out when the medical instruments are still in the packaging, such that said instruments are kept sterile until they are opened. The sterilization means commonly used are gamma-irradiation, or the use of ethylene oxide gas, of steam or of formaldehyde vapor, which pass through the pores of the material so as to sterilize the instruments or prostheses contained in the packaging.

Packaging for medical instruments or prostheses is generally made up of a rigid or pseudo-rigid or flexible part, which can take substantially the shape of the medical object under consideration, on which a heat-sealing substrate is heat-sealed. The rigid or pseudo-rigid or flexible part is, for example, thermoformed. This packaging is usually opened where the sealing is located.

Such packaging, and more particularly the heat-sealable material used to make the seal, must generally meet several criteria with a view to its specific use. Thus, in addition to its heat-sealing properties, the material should advantageously be a breathable material, namely exhibit appropriate permeability for enabling the sterilization operation by allowing the sterilizing agent, for instance ethylene oxide, steam or formaldehyde vapor, to penetrate, while at the same time preventing contamination after sterilization. This packaging material may exhibit the functions required to allow it to be printed.

Moreover, in order to allow aseptic opening, the material must have properties of resistance to delamination when the packaging is opened.

Finally, the strength of the material must be sufficient to protect the objects packaged, and to withstand any perforation that might be caused by the content during transportation phases.

It is known practice to produce heat-sealable papers by coating the papers offline using a heat-sealable agent.

The offline coating multiplies additional labor and storage costs.

WO 98/24970 describes a peelable packaging comprising a heat-sealed reinforced paper coated with a layer of dielectric material formed from polyolefin polymers and copolymers.

Moreover, the publications EP 528 874, US 2007/0107381 or WO 99/32044, for example, describe the use of polyurethanes for their adhesive properties, in particular in laminates, or alternatively WO 03/086877 describes the use of polyurethanes for forming glue lines, including for sterilizable packaging. Polyurethane is also used in medical applications, for instance in U.S. Pat. No. 6,063,498.

There is a need to take advantage of fibrous materials which meet the requirements relating to their use in the medical field, which can be manufactured more economically.

SUMMARY OF INVENTION

One of the aims of the invention is therefore to provide a fibrous packaging material, forming a suitable septic barrier, which is heat-sealable, in particular which has an acceptable seal strength after sterilization, and which has a mechanical strength and a delamination resistance that are compatible with packaging for medical devices.

Another aim of the invention is to provide a process for preparing such a material, which is both simple and adaptable to the existing paper machines or any other tool for forming a nonwoven web by dry or wet processing.

Figure 2A:
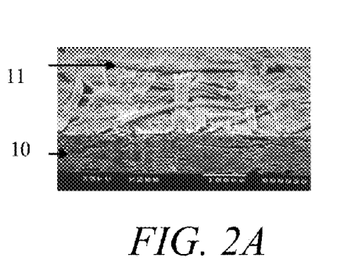
FIG. 2A is a photograph of a sectional view of a fibrous single-layer substrate.
Figure 2B:
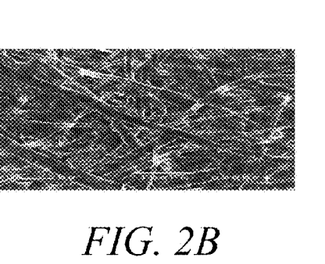
FIG. 2B is a photograph of a top view of the fibrous single-layer substrate.
Figure 2C:
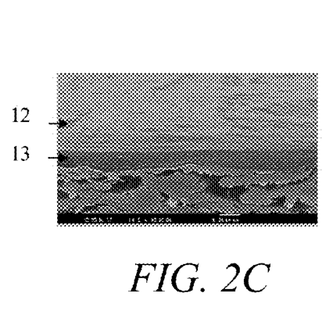
FIG. 2C is a photograph of a sectional view of a coated fibrous material according to the invention.

One of the difficulties lies in the fact that the fibers at the surface of the fibrous material in contact with the heat-sealed polyolefin counterpart are not totally covered with a thickness of coating (see FIG. 2C). The separation, or peeling, of the two materials after heat-sealing occurs at the actual interface, thus stressing the fibers of the fibrous material, causing a delamination of the fibrous material, which cannot happen if aseptic opening of a medical device packaging is to be guaranteed (cf. FIG. 2D).

There is therefore a need to provide a sizing composition capable of offering both the function of reinforcing the fibrous materials so as to guarantee aseptic opening, and the heat-sealing function, while at the same time both preserving an air permeability sufficient to allow the sterilizing agent to pass through when the latter is gaseous (vapor, ethylene oxide, formaldehyde) and providing a barrier to microbes.

The aim of the invention is therefore also to provide a sizing composition intended for obtaining said heat-sealable material.

A subject of the invention, according to one of its aspects, is thus a fibrous material for medical packaging which is heat-sealable, comprising a fibrous single-layer substrate, nonwoven or paper, impregnated to the core with at least one polyurethane.

A subject of the invention, according to one of its aspects, is also a fibrous material for medical packaging which is heat-sealable, comprising a fibrous single-layer substrate, nonwoven or paper, impregnated to the core with at least one polyurethane, at least one tackifier and optionally at least one functional additive.

According to another of its aspects, the invention is directed toward a process for manufacturing a fibrous material for medical packaging which is heat-sealing, comprising at least:

a step of sizing to the core a fibrous single-layer substrate, nonwoven or paper, with a sizing composition comprising an aqueous dispersion of at least one polyurethane, and preferentially comprising an aqueous dispersion of at least one polyurethane and at least one tackifier, and at least one functional additive, and a drying step.

A subject of the invention is also a composition for sizing a fibrous single-layer substrate, nonwoven or paper, comprising:
at least one polyurethane,
at least one tackifier,
optionally at least one cobinding or reinforcing agent, and optionally at least one functional additive.

The invention also extends to a fibrous material for medical packaging which is heat-sealable, comprising a fibrous single-layer substrate, nonwoven or paper, coated using a composition comprising at least one polyurethane and preferentially also at least one tackifier and optionally at least one functional additive, in particular as described hereinafter.

The invention also relates to a process for manufacturing such a fibrous material for medical packaging which is heat-sealing, comprising at least one step of coating a fibrous single-layer substrate, nonwoven or paper, with a composition comprising an aqueous dispersion of at least one polyurethane and preferentially also at least one tackifier and optionally at least one functional additive.

Thus, the present invention also relates to such a material for medical packaging produced by means of an offline coating process using a composition as described hereinafter and referred to as sizing composition.

Finally, the invention relates to a packaging for medical use, comprising a fibrous material for medical packaging which is heat-sealable, in accordance with the present invention.

The invention relates lastly to the use of a sizing composition comprising at least one polyurethane and at least one tackifier and optionally at least one functional additive, for impregnating a fibrous single-layer substrate, nonwoven or paper, in order to give it heat-sealing properties, while preserving its air permeability without affecting the microorganism-barrier properties.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The invention makes it possible to provide a fibrous material for medical packaging which is heat-sealable, which has the required properties in terms of adhesion and peelability.

In addition, the invention makes it possible, by virtue of the online provision of the adhesive properties, to simplify the process for manufacturing the fibrous packaging material, by comparison with the existing techniques.

The expression "fibrous packaging material having a heat-sealable property" denotes a fibrous packaging material which is capable of sealing, namely of adhering with a third material, with which it has been brought into contact for a predetermined time under the action of heat, and generally while exerting a pressure.

More particularly, the expression "fibrous packaging material having a heat-sealable property" denotes a fibrous packaging material which is capable of sealing, namely of adhering with a third material, through the action of a temperature which makes it possible to reach a temperature at the interface of the two materials that is higher than the activation temperature of polyurethane, for example between 45° C. and 200° C., and more particularly between 60° C. and 150° C. and while exerting a pressure of greater than 200 kPa, for a time which can range from 0.2 to 4 seconds. The seal strengths obtained will be greater than 100 cN/15 mm and more particularly greater than 150 cN/15 mm, guaranteeing aseptic opening.

The fibrous packaging material according to the invention makes it possible to obtain sealing which withstands the selected mode of sterilization. The composition of the fibrous packaging material may be adapted to said mode, as subsequently detailed.

The term "aseptic opening" or "peelability" is intended to mean, when the packaging is opened at the level of the heat-sealable material, the material does not tear and does not delaminate, so as to avoid the formation of free fibers, particles or other debris, which would pollute the working space of the practitioner; these particles in fact constitute a vector for the transmission of microorganisms.

The term "seal strength" is intended to mean the tensile force that needs to be applied to the ends of the two heat-sealed portions in order to separate them from one another. This strength is measured according to ASTM F88 in a "T-peel" test at an elongation speed of 200 mm/min.

The term "single-layer substrate" is intended to mean a substrate, the composition of which is relatively homogeneous over its width. Such a substrate differs from a laminate consisting of various layers of different natures, superimposed on one another.

The single-layer substrate may be single-ply or two-ply.

The fibrous packaging material which is heat-sealing is obtained by means of sizing to the core of the single-layer substrate.

The expression "sizing or impregnation to the core" is intended to mean that the sizing composition is implanted deep into the substrate and is also at the surface. Thus, the fibers of the substrate are coated with the composition.

This treatment differs in particular from a coating step in which the coating composition surface-coats a substrate, without reaching the core of said substrate.

Nonwoven Fibrous Single-Layer Substrate

The substrate which is of use for implementing the present invention can be any paper or nonwoven which is in particular innocuous and has the mechanical properties suitable for medical use.

This encompasses nonwoven fibrous papers comprising natural fibers, in particular cellulose-based fibers, or synthetic fibers or else a mixture of natural and synthetic fibers.

Among the natural fibers, mention may be made of wood fibers, for example eucalyptus fibers, coniferous tree fibers or a mixture thereof, cotton fibers, bamboo fibers, viscose fibers, straw fibers, abaca fibers, asperto fibers, hemp fibers, jute fibers, flax fibers, sisal fibers or mixtures thereof.

The fibers may be bleached, semi-bleached or unbleached.

Among the synthetic fibers, mention may be made of polyester fibers, polyamide fibers, rayon fibers and viscose fibers.

Typically, in the context of the present invention, the term "long fibers" is intended to mean fibers having a length greater than or equal to 0.6 mm and the term "short fibers" is intended to mean fibers having a length of less than 0.6 mm.

The fibers may be short or long.

The fibers can have an average length between 0.1 and 30 mm and in particular between 1 and 15 mm.

In one particular embodiment, the substrate comprises at least 5% by weight of long fibers, relative to the weight of the substrate.

By way of optional additive which can be used in the fibrous substrate, mention may be made of titanium dioxide, calcium carbonate, kaolin, talc, starches, sizing agents, pigments and moisture-resisting agents.

According to one particular embodiment, the nonwoven fibrous single-layer substrate is chosen from supports consisting of a mixture of wood fibers.

The mass per unit area of the fibrous substrate before sizing can be generally between 20 and 150 g/m², and preferably ranges from 40 to 110 g/m².

The nonwoven fibrous single-layer substrate advantageously has an air permeability compatible with medical use (preferentially a Bendtsen porosity above the bottom limit described in standard 868-6:2009, of 18 ml/min, i.e. an air permeance of greater than 0.2 μm/Pa with respect to air permeance when measured according to ISO 5636-3), allowing the sterilization gas, for example ethylene oxide, formaldehyde vapor or water vapor, to pass through, and microbiological barrier qualities according to the usual standards.

Consequently, the fibrous substrate before sizing or impregnation, which can be used in the context of the present invention, can in particular have a Bendtsen air permeability of less than 3000 ml/min, preferentially less than 2700 ml/min Bendsten and more favorably less than 1875 ml/min Bendsten.

The fibrous single-layer substrate before sizing can be obtained on an inclined table, former, Fourdrinier table or cylinder mold or any other tool capable of forming a web of fibers from their mixture by dry processing, for instance according to dry-laid technologies, or from their mixture in suspension in water by wet processing, for instance according to wet-laid technologies. The substrate can be obtained, for example, by means of an aqueous suspension in any proportion of long and/or short natural wood fibers, for example. These fibers, once placed in suspension, are preferentially refined and supplemented with adjuvants well known to those skilled in the art which allow them to be processed. In particular, use may be made of antifoams, binders, pigments, inorganic fillers, moisture-resisting agents and sizing agents. This fibrous mixture can then be drained on a wire in order to result in the formation of a fibrous mat which is subsequently dried before the online sizing step.

Sizing Composition

For the purpose of meeting the requirements of adhesiveness and peelability set out above, the sizing composition in accordance with the present invention comprises at least one polyurethane, and preferably at least one tackifier, and optionally at least one functional additive. It can also comprise at least one cobinding agent or reinforcing agent and/or at least one functional additive.

Polyurethane

According to one particular embodiment of the invention, the polyurethane is present in the sizing composition in the form of an aqueous dispersion of polyurethane particles.

The polyurethanes can be characterized by an activation temperature above 25° C., in particular above 40° C. and preferentially above 60° C. They can also be characterized by a glass transition temperature or Tg below 40° C., preferentially below 20° C., for example between −85° C. and 20° C., preferentially below 10° C. and more preferentially below 0° C.

In the context of the present invention, the term "activation temperature or $T_{act}$" is intended to mean the temperature above which the heat-sealing properties manifest themselves, and more specifically the temperature starting from which the polyurethane adheres to the material while exhibiting a seal strength greater than 60 cN/15 mm.

Mention may be made, without limiting the scope of the invention, of: the emulsions sold under the names CUR 21 (Tg=0° C.), U400N (Tg=−75° C.) and U210-1VP (Tg=0° C.) by the company Alberding-boley, but also the dispersions sold by the company Bayer Material Science, namely Dispercoll U42 (Tg=−5° C./$T_{act}$ 80-100° C.), U53 (Tg=−55° C./$T_{act}$ 45-55° C.), U54 (Tg=−55° C./$T_{act}$ 45-55° C.) and U56 (Tg=−55° C./$T_{act}$ 40-50° C.), and, finally, the emulsions Neoresine R551 and R9330 (Tg=−47° C./$T_{act}$ 65° C.), sold by the company DSM Resin.

The size of these particles can be between 50 nm and 500 nm, or even between 100 nm and 300 nm, measured by observation using a scanning electron microscope or using a particle size analyzer coupled to a laser counter.

The polyurethane can be present in the composition in a content of between 1.5% and 60% by weight, in particular between 1.5% and 40% by weight, especially between 5% and 50% by weight, in particular between 2% and 35%, or even 2.5% and 30% by weight and more particularly between 10% and 30% by weight, relative to the total weight of the composition.

Cobinding Agent or Reinforcing Agent

The sizing composition can, according to one embodiment of the present invention, also comprise a cobinding agent or reinforcing agent.

In the context of the present invention, the terms "cobinding agent" and "reinforcing agent" are considered to be equivalent.

The purpose of the cobinding or reinforcing agent is in particular to reinforce the fibrous substrate. Thus, said fibrous substrate is strengthened such that delamination, which favors contamination of the object contained in the packaging, is avoided.

In the context of the present invention, the reinforcement of the fibrous substrate can be provided by a latex.

In the context of the present invention, the term "latex" denotes any polymer in emulsion in an aqueous medium.

By way of cobinding or reinforcing agent which can be used to form the reinforced fibrous substrate, mention may in particular be made of emulsions of acrylic copolymers (such as Vinacryl® 4375, having a Tg=3° C., sold by the company Celanese), of vinyl acetate (such as Acronal® 500D, having a Tg of −13° C., from BASF, Texicote® 03-029, having a Tg of 13° C., Texicryl® 13-976, having a Tg of 5° C., sold by the company Scott Bader) and mixtures thereof, preferentially of a styrene acrylic emulsion (such as ECO 3836, having a Tg of −12° C., from Rohm & Haas, or Cartacoat B600, having a Tg of −25° C., from Clariant, and Texicryl® 13976, having a Tg of 5° C., from Scott Bader) or of a styrene butadiene emulsion (XZ 94755 from Dow, having a Tg=−25° C.).

It may be characterized by its glass transition temperature Tg below 50° C., particularly below 20° C. and preferentially below 0° C.

According to one particular embodiment, the cobinding or reinforcing agent can be chosen from styrene acrylates, such as, for example, the acrylate ECO® 3836 from Clariant, and styrene butadiene products, for example XZ 94755 from Dow, and vinyl acetate, for instance Acronal® 500D from BASF.

The cobinding or reinforcing agent can be present in the composition in a dry matter content of less than 50% by weight, in particular less than 35% by weight of dry matter and more particularly less than 20% by weight, relative to the total weight of the composition, in particular between 1.5% and 40% by weight, 3% to 35% by weight, or else 3.5% to 30% by weight.

Tackifier

The sizing composition may also comprise at least one tackifier.

According to one particular aspect of the invention, the sizing composition comprises at least one polyurethane and at least one tackifier.

The purpose of the tackifier is in particular to adjust, as required, the heat-sealability properties of the substrate according to the nature of the sterilization and the nature of the rigid or semi-rigid polyolefin-based counterpart.

Said tackifier can be chosen from ethylene acrylic acid copolymers, terpene derivatives, ionomers and mixtures thereof.

By way of example, mention may be made of the substances Cartaseal SVU sold by the company Clariant, Michem Prime 4983RE, 4990RE and 2960 E sold by the company Michelman, Tecseal E 787 sold by Trub for the ethylene acrylic acids, for instance Dermulsen TR602 sold by the company DRT for the terpene derivatives, and Surlyn D3308 sold by the company Dow Chemical for the ionomers.

The copolymers of ethylene and of acrylic or methacrylic acids can be chosen with a percentage of acrylic acid of between 0 and 40% and more particularly between 10% and 30%. They can also have a polymer melt flow, in g/10 minutes, of between 50 and 1000 g/10 min. They can also have a softening temperature Tm° C. above 35° C., preferentially above 45° C. and, in one particular embodiment, preferentially above 60° C.

The terpene derivatives may be chosen from those which have a softening temperature below 120° C. and preferentially below 100° C.

According to one particular embodiment, the tackifier is chosen from copolymers of ethylene acrylic acid, commonly known as EAA.

The tackifier may be present in the composition in a dry matter content of less than 25% by weight, in particular less than 20% by weight and more preferentially less than 15% by weight, relative to the total weight of the composition, in particular between 0.2% and 20% by weight, or between 0.2% and 10% by weight.

Functional Additives

According to one advantageous embodiment, the composition in accordance with the present invention also comprises a functional additive, for example capable of improving the homogenization of the composition, or for example capable of allowing the use of the sizing composition in a Size Press, or of regulating the penetration of the sizing composition into the fibrous substrate as required.

By way of functional additive, mention may in particular be made of polyvinyl alcohols, for which those skilled in the art may choose as a function of the molar mass and the degree of hydrolysis in order to adjust the viscosity, according to their general knowledge.

The polyvinyl alcohols can be obtained from the hydrolysis of the corresponding polyvinyl acetates. This degree of hydrolysis (or of saponification) is advantageously expressed as mol % of saponified polyvinyl acetate units.

Those skilled in the art can choose the polyvinyl alcohol as a function of the viscosity of an aqueous 4% solution of this polyvinyl alcohol, measured at 23° C. according to standard DIN 53015.

Thus, according to one particular embodiment, the polyvinyl alcohol can have a viscosity as described below, namely less than 10 mPa·s, and a degree of hydrolysis of greater than 85%, and preferentially have a viscosity of less than 6 mPa·s and a degree of hydrolysis of greater than 95%.

Other functional additives may also be mentioned: sizing agents, for instance those based on an alkyl ketene dimer, carboxymethylcellulose, antifoams, starches, inorganic fillers, such as calcium carbonate, talc, kaolin or titanium, pigments, products which are a barrier to fats and lipids with a low surface tension, and compounds capable of adjusting the pH, such as potassium hydroxide or aqueous ammonia.

The functional additive can also be chosen to have viscosity characteristics such that, in the form in which it is added, it creates a final Brookfield viscosity, at 23° C., of the sizing composition of less than 1000 centipoises, in particular less than 500 centipoises and preferentially less than 250 centipoises when measured at 100 rpm.

These functional additives can in particular be present in a dry matter of less than 10% by weight, and in one particular embodiment, less than 2% relative to the total weight of the composition, especially between 0 and 10% by weight and in particular between 0 and 5% by weight.

The sizing composition can be obtained by mixing the compounds mentioned above according to techniques known to those skilled in the art.

In particular, the mixing may require a stirring step, or even a cooking step.

According to one particular embodiment, the sizing composition comprises a polyurethane, for example having an activation temperature above 60° C., a copolymer of ethylene acrylic acid, in particular comprising between 10% and 30% of acrylic acid and having a melting point above 60° C. and a polyvinyl alcohol, an aqueous 4% by weight solution of which in particular has a viscosity of less than 6 mPa·s at 23° C., and which has a degree of hydrolysis of greater than 95%.

Heat-Sealable Fibrous Material for Medical Packaging

The fibrous packaging material which is heat-sealing can be made capable of being printed.

Composition of the Fibrous Packaging Material

The measurement of the dry matter content of the compounds resulting from the sizing composition in the fibrous packaging material according to the present invention can be carried out at a hygrometry of between 0.5% and 6% and preferentially between 4% and 6%.

Under these conditions, the content of polyurethane raw material can range from 1% to 25% by weight, in particular from 2% to 20% and preferentially from 2% to 15% by weight, relative to the total weight of the final fibrous packaging material.

Under the same conditions, the dry matter content of cobinding or reinforcing agent, when it is present, can range from 1% to 15% by weight, in particular from 2% to 15% and preferentially from 2% to 10% by weight, relative to the total weight of the final fibrous packaging material.

Still under these same conditions, the dry matter content of tackifier is less than 15%, in particular can range from 0.2% to 15% by weight and preferentially from 0.2% to 10% by weight, relative to the total weight of the final fibrous packaging material.

Still under these same conditions, the content of functional additive, when it is present, is between 0.1% and 7% by weight, more particularly between 0.1% and 5% by weight especially, and in particular, when the functional additive consists of polyvinyl alcohol, less than 2% and more particularly less than 1% by weight, relative to the total weight of the final fibrous packaging material.

According to one particular embodiment, the fibrous packaging material which is heat-sealing comprises a fibrous single-layer substrate, nonwoven or paper, impregnated to the core with at least one polyurethane, for example, having an activation temperature above 60° C., with at least one copolymer of ethylene acrylic acid, in particular comprising between 10% and 30% of acrylic acid and having a melting point above 60° C. and with at least one polyvinyl alcohol, an aqueous 4% solution of which in particular has a viscosity of less than 6 mPa·s at 23° C. and which in particular has a degree of hydrolysis of greater than 95%.

The above percentages by weight are valid regardless of the process implemented with the packaging composition, namely coating or sizing to the core.

Thus, according to a first embodiment, the present invention is directed toward a fibrous material for medical packaging which is heat-sealable, comprising a nonwoven fibrous single-layer substrate sized to the core with at least one polyurethane and at least one cobinding or reinforcing agent, in particular as previously defined.

According to this embodiment, the polyurethane dry matter content can be between 1% and 25% by weight, in particular between 2% and 20% by weight, and the cobinding or reinforcing agent dry matter content can be between 1% and 15% by weight, in particular between 2% and 10% by weight, relative to the total weight of the final fibrous packaging material.

According to a second embodiment, the present invention is directed toward a fibrous material for medical packaging which is heat-sealing, comprising a nonwoven fibrous single-layer substrate sized to the core with at least one polyurethane and at least one tackifier, in particular as previously defined.

According to this embodiment, the polyurethane dry matter content can be between 1% and 20% by weight, in particular between 2% and 15% by weight, and the tackifier dry matter content can be less than 15%, between 0.2% and 10% by weight, and in particular between 0.5% and 7% by weight, relative to the total weight of the final fibrous packaging material.

According to a third embodiment, the present invention is directed toward a fibrous material for medical packaging which is heat-sealing, comprising a nonwoven fibrous single-layer substrate sized to the core with at least one polyurethane, at least one cobinding or reinforcing agent, in particular as previously defined, and at least one tackifier, in particular as previously defined.

According to this embodiment, the polyurethane dry matter content can be between 1% and 20% by weight, in particular between 2% and 15% by weight, the cobinding or reinforcing agent dry matter content can be between 1% and 15% by weight, in particular between 2% and 10% by weight, and the tackifier dry matter content can be between 0.2% and 10% by weight and in particular between 1% and 7% by weight, relative to the total weight of the final fibrous packaging material.

According to a fourth embodiment, the fibrous material for medical packaging which is heat-sealable does not comprise any polyolefin, in particular any polyethylene and polypropylene.

Characterization of the Heat-Sealable Fibrous Material for Medical Packaging

According to the preferred embodiment of sizing to the core, the fibrous packaging material for medical packaging which is heat-sealable can be readily differentiated from the medical papers commonly used insofar as the two faces of the single-layer material obtained have a heat-sealing property owing to the presence of the sizing composition on its two faces. This is not the case with the coated or laminated papers of the prior art.

Microbiological Barrier

The fibrous packaging material which is heat-sealing according to the present invention meets the requirements of the microbiological barrier test in accordance with the standard entitled "BARRIER DIN TEST" DIN ISO 58953-6 (subclause) section 3 (under humidity) & section 4 (with air permeance). In particular, and with regard to section 3 under humidity, the total number of colonies of microbes having passed through 20 samples of the material according to the present invention may be between 0 and 4 (Pass/Fail), and in particular equal to 0. In particular, under the barrier test conditions described in section 4 of standard DIN-ISO 58953/6, the total number of colonies of microbes having passed through 10 samples of the material according to the present invention may be between 0 and 15, and in particular equal to 0, without however exceeding 5 on each sample taken individually, and preferentially equal to 0.

The fibrous packaging material according to the invention is advantageously also characterized by its barrier property evaluated according to the bacterial filtration efficiency test described according to standard ASTM F2101-01. This test expresses the ratio of the number of microorganisms stopped by the material tested, divided by the number of microorganisms sprayed onto the material tested. In particular, the ratio of microbes stopped by the material according to the present invention can be between 80% and 100%, in particular greater than 95%.

The fibrous packaging material which is heat-sealing according to the present invention preferably meets these same requirements, including after sterilization.

Barrier to Liquids

The fibrous packaging material which is heat-sealing according to the invention advantageously has liquid-barrier properties which can be quantified according to the "Cobb" method described in ISO535, in which the amount of water absorbed by the fibrous packaging material after one minute is measured.

According to this method, the fibrous packaging material advantageously has a Cobb value of less than 30 $g/m^2$, in particular less than 20 $g/m^2$ and more particularly of 15 $g/m^2$.

Seal Strength

The fibrous packaging material according to the present invention advantageously has a seal strength compatible with its use.

The seal strength can be measured according to the method B (ends held) described by ASTM F88. The seal strength is measured at a constant end-separation speed of 200 mm/min.

In particular, the fibrous material for medical packaging which is heat-sealing according to the present invention can have a seal strength of greater than 100 cN/15 mm, in particular greater than 120 cN/15 mm, and preferentially greater than 150 cN/15 mm, or even of 175 cN/15 mm when measured in a T-peel test according to standard ASTM F88.

Maximum Pore Diameter

The microbial-barrier properties of the fibrous packaging material of the present invention are also dependent on the maximum pore diameter when measured according to the method described in normative Appendix D of EN 868-3: 2009.

In particular, the maximum pore diameter of the fibrous packaging material of the present invention can be advantageously less than 50 µm, in particular less than 35 µm and preferably less than 20 µm.

Bendtsen Porosity

The porosity of the fibrous packaging material which is heat-sealing can in particular range from 20 to 2500 ml/min, in particular from 100 to 1500 ml/min, according to the Bendtsen porosity measurement method, in accordance with standard ISO 5636-3.

Method of Manufacturing the Heat-Sealable Fibrous Material for Medical Packaging The present invention is directed toward a process for manufacturing a fibrous material for medical packaging which is heat-sealing, characterized in that it comprises at least:
- a step of sizing to the core a fibrous single-layer substrate, nonwoven or paper, with a sizing composition comprising an aqueous dispersion of at least one polyurethane and preferentially at least one tackifier, and
- a drying step.

Various sizing methods can be used.

Among the sizing methods, mention may be made of impregnation, saturation, precipitation at the core or spraying. All these methods are well known to those skilled in the art.

Typically, according to a first embodiment, the fibrous single-layer substrate is exposed to an excess of sizing solution by application via pressure, preferably on either side of the substrate. The fibrous single-layer substrate is, for example, driven through a press, for example a size press, and then dried.

Any other equipment equivalent to a size press can, of course, be used in the context of the present invention, provided that saturation to the core and at the surface are obtained, for example an impregnator, a film press, a kiss-roll coater, a gravure roll.

Typically, according to a second embodiment, the fibrous substrate is sprayed with the sizing solution in accordance with the present invention, and then dried.

According to a third embodiment, the solution is precipitated at the core of the substrate in the aqueous phase before the formation of the sheet, and then the whole assembly is dried.

According to one embodiment, this sizing step is carried out online, i.e. the sizing is carried out over the width which comes from the forming wire, the sizing progressing at the same speed as the formation of the fibrous substrate. The machine used is, for example, a paper machine with a full Fourdrinier table, or else a machine for forming a nonwoven web by dry processing, of Airlaid type.

The application of the sizing composition, preferably in excess on either side of the substrate, makes it possible to obtain deep impregnation into the substrate. The pressure exerted allows the composition to penetrate into the pores of the substrate and makes it possible to obtain a substrate impregnated homogeneously in all three dimensions.

The excess composition can be removed by scraping.

The sizing step is followed by a drying step. The fibrous substrate is, for example, passed through a drying section made up of steam-heated cylinders brought into contact with both sides of the fibrous substrate, or subjected to infrared radiation, or passed through a tunnel blowing hot air through the fibrous substrate.

The drying can be carried out at a temperature of between 50 and 250° C., in particular between 60 and 150° C., and preferentially below 110° C.

The water is, for example, evaporated off so as to achieve a content of between 0.5% and 6%, for example between 4% and 6% and preferentially between 3% and 6% by weight in the final fibrous substrate.

According to one embodiment of the present invention, the process comprises no step of coating with a thermoadhesive composition.

Packaging

The invention further relates to a packaging, in particular a medical packaging, comprising at least one medical paper which is heat-sealable in accordance with the present invention.

The rigid or pseudo-rigid or flexible part of the packaging, which is generally thermoformed, is also suitable for forming an antibacterial barrier. It can in particular be formed from conventional polymers composed of at least one of the polymers chosen from the group comprising polyester (PES), polyethylene (PE), polypropylene (PP), polystyrene (PS), polyethylene terephthalate (PET), amorphous polyethylene terephthalate (APET) and polyvinyl chloride (PVC).

Figure 1:
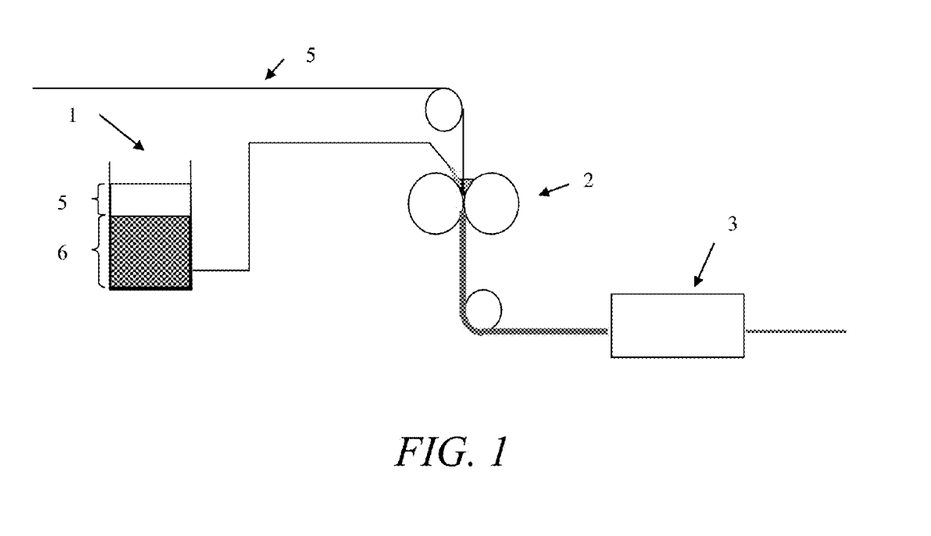
FIG. 1 is a diagrammatic illustration of the method of manufacturing a heat-sealable fibrous medical substrate according to the invention.

Partially represented in FIG. 1 is a fibrous substrate manufacturing line in which the fibrous single-layer substrate 5 leaves, for example, a fibrous substrate formation tank and is impregnated to the core, by passing through a size press 2, with a sizing composition 1 comprising at least one polyurethane dispersed in the aqueous phase 5, the dry matter being represented in 6. The fibrous substrate thus impregnated then passes through a drying section 3.

Represented in FIGS. 2A and 2B are photographs of a fibrous single-layer substrate 10 respectively as a sectional view and as a view from above.

The intertwined fibers 11 are distinguished.

By way of illustration of a heat-sealable paper for medical use prepared by offline coating according to the invention, a photograph of a coated fibrous material has been represented in FIG. 2C. The coating 12 clearly distinguishes from fibrous material 13.

Figure 2D:
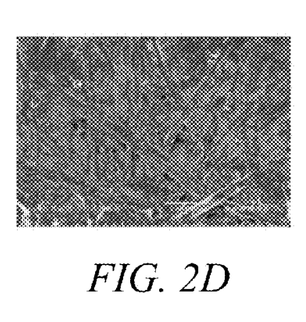
FIG. 2D is a photograph of a top view of the coated fibrous material according to the invention.

A photograph of a medical fibrous material which is heat-sealable in accordance with the invention, comprising a mixture of polyurethane and of ethylene acrylic acid, has been represented in FIG. 2D. It is noted that the composition is distributed within the fibrous network.

The homogeneity of said fibrous material is also noted.

The mass per unit area of this paper is 80 g/m$^2$.

The examples hereinafter illustrate the invention without limiting the scope thereof.

Example 1

Sizing Composition

According to the first embodiment described in the present invention, mention may be made, for example, of the following sizing composition comprising a polyurethane and also a tackifier.

According to one preferential preparation, the introduction of the polyurethane emulsion precedes that of the tackifier.

|  | Percentage by weight of dry matter relative to the total weight of the composition |
|---|---|
| Polyurethane[1] | 13.6% |
| Tackifier[2] | 8.5% |
| Total dry matter | 22.1% |

[1] sold under the name Dispercoll U42 by the company Bayer Material Science.
[2] sold under the name Michem Prime 2960E by the company Michelman.

Example 2

Fibrous Material for Medical Packaging which is Heat-Sealable

The starting material is a fibrous substrate composed of a mixture of bleached short eucalyptus fibers and of bleached long conifer-tree fibers. The content by dry weight of the fibers relative to the total weight of final paper conditioned at a hygrometry of 5% is, respectively, 42% for the bleached short fibers and 42% for the bleached long fibers.

Before impregnation, this fibrous substrate has a Bendtsen porosity of 1400 ml/min. This fibrous substrate, once formed and dried by being passed over steam-heated rolls, is impregnated online with the sizing composition according to example 1 by means of a size press, and then is dried. The final hygrometry is 5% and the final mass per unit area is 82 g/m$^2$.

The resulting paper is characterized by its percentage by weight of dry matter present in the heat-sealing medical paper, as follows:

| Polyurethane | 6.2% |
|---|---|
| Tackifier | 3.9% |
| Cobinding or reinforcing agent | 0% |
| Water | 5% |
| Total dry matter | 10.1% |

Maximum Pore Diameter

The mean maximum pore diameter is 17.5 μm without, however, exceeding 20 μm, when measured according to the method described by normative Appendix D of standard EN 868-3:2009.

ASTM F88 Seal Strength of Example 2

The sealability is evaluated on two types of films:

1—a film consisting of polyamide and of polyethylene which is 85 μm thick,

2—a film consisting of PET/PE which is 52 μm thick.

The sealing conditions are, respectively:

1—Application of a pressure of 450 kPa for 1.2 seconds at 160° C.

2—Application of a pressure of 600 kPa for 2 seconds at 160° C.

Under these conditions, a "peelable" seal is obtained which does not cause any delamination of the heat-sealable fibrous material when it is opened.

According to the "T-peel" unsealing method described by standard ASTM F88 and at a seal opening speed of 200 mm/min, the unsealing forces were evaluated at 250 cN/15 mm when the paper is sealed against the 85 μm first film made of polyamide/polyethylene, and at 350 cN/15 mm when sealed against the 52 μm polyethylene terephthalate/polyethylene film.

Example 3

Sizing Composition

According to the second embodiment described in the present invention, mention may be made, for example, of the following sizing mixture comprising a polyurethane emulsion and also a cobinding or reinforcing agent, which is introduced into the preparation last.

|  | Percentage by weight of dry matter relative to the total weight of the composition |
|---|---|
| Polyurethane[1] | 12.5% |
| Cobinding agent[3] | 12.5% |
| Total dry matter | 25% |

[1] sold under the name Dispercoll U56 by the company Bayer Material Science.
[3] sold under the name XZ 94755 by the company Dow.

Example 4

Fibrous Material for Medical Packaging which is Heat-Sealable

According to the same manufacturing process described in example 2 of the present invention, the starting material is a fibrous substrate composed of a mixture of bleached short eucalyptus fibers and of bleached long conifer-tree fibers. The content by dry weight of the cellulose-based fibers relative to the total weight of the final paper conditioned at a hygrometry of 5% is, respectively, 47% for the bleached short fibers and 32% for the bleached long fibers.

Before impregnation, this fibrous substrate has a Bendtsen porosity of 2000 ml/min. This fibrous substrate, once formed and dried, is impregnated online with the sizing composition according to example 3 by means of a size press, and is then dried. The final hygrometry is 5% and the final mass per unit area is 89 g/m$^2$.

The resulting paper is characterized by its percentage by weight of dry matter present in the heat-sealing medical paper, as follows:

| Polyurethane | 7.5% |
|---|---|
| Cobinding or reinforcing agent | 7.2% |
| Water | 5% |
| Total dry matter | 14.7% |

Air Permeability:

The resulting paper has a Bendtsen porosity of 756 ml/min according to the test described by standard ISO 5636.

The maximum pore diameter is 17.8 μm when measured in accordance with the standard.

Seal Strength

A peelable seal can be obtained between the final paper and a polyamide/polyethylene film 170 μm thick by applying a pressure of 600 kPa for 1.2 seconds at 160° C. The opening of the seal did not cause delamination of the heat-sealable medical paper obtained in this example 4.

The unsealing force was measured according to standard ASTM F88 in a "T-peel" test, with an opening speed of 200 mm/min.

The unsealing force was then evaluated before and after sterilization with ethylene oxide gas. In both cases, the forces remain greater than 175 cN/15 mm.

| Unsealing force | Before sterilization | 198 cN/15 mm |
| Unsealing force | After sterilization | 188 cN/15 mm |

Example 5

Sizing Composition

According to the third cited embodiment, this example illustrates the use of a sizing composition comprising a polyurethane, a cobinding or reinforcing agent, a tackifier and also a functional additive for regulating the viscosity of the bath and also the uniformity of the impregnation into the fibrous substrate.

During the preparation, after a first portion of water, the cobinding or reinforcing agent is introduced, followed by the functional additive, the polyurethane emulsion and the tackifier, in that order. Finally, a last portion of water is added.

| Example 5 | Percentage by weight of dry matter relative to the total weight of the composition |
|---|---|
| Polyurethane[1] | 5.6% |
| Tackifier[2] | 2.8% |
| Cobinding or reinforcing agent[3] | 6.3% |
| Polyvinyl alcohol[4] | 0.3% |
| Total dry matter | 15% |

[1] sold under the name Dispercoll U56 by the company Bayer Material Science.
[2] sold under the name Michem Prime 4983 RE by the company Michelman.
[3] sold under the name Texicote ® 03-29 by the company Scott Bader.
[4] sold under the name Celvol 4-98 by the company Celanese.

Example 6

Fibrous Material for Medical Packaging which is Heat-Sealable

The starting material is a fibrous substrate composed of a mixture of short eucalyptus fibers and semi-bleached conifer-tree fibers. The content by weight relative to the total weight of the final paper conditioned at a hygrometry of 4% is, respectively, 33.5% for the short fibers and 50% for the semi-bleached long fibers.

Before impregnation, this fibrous support has a Bendtsen porosity of 1550 ml/min. This fibrous support, once formed and dried, is impregnated online with the sizing composition according to example 5 by means of a size press, and is then dried. The final hygrometry is 4%. The final mass per unit area is 75 g/m².

The resulting paper is characterized by its percentage by weight of dry matter present in the heat-sealing medical paper, as follows:

| Polyurethane | 4% |
| Tackifier | 2% |
| Cobinding or reinforcing agent | 4.5% |
| Functional additive | 0.2% |
| Water | 4% |
| Total dry matter | 10.7% |

The paper obtained is then tested for the purpose of determining its various characteristics.

Microbiological-Barrier Test

According to the standard entitled "Bacterial Filtration Efficiency" ASTM F2101-01, the proportion of microbes stopped by the paper obtained is 99.6%.

This paper is also described as being a sufficient barrier to microbes in the wet and dry state when tested according to the methods described in sections 3 and 4 of standard DIN ISO 58953-6.

Liquid-Barrier Test

The hydrophobicity of the final paper, when measured according to the Cobb test method described by standard ISO 535, is 16 g/m².

ASTM F88 Seal Strength

The sealability is measured by sealing the final paper onto a film which is 85 μm thick and which comprises polyamide and a layer of polyethylene.

The sealing is carried out at a pressure of 600 kPa, for 1.2 seconds, and at a temperature of 160° C.

The seal strength is then measured in a "T-peel" test at an elongation speed of 200 mm/min, and evaluated at 250 cN/15 mm. No delamination is observed.

The expression "comprising a" should be understood to be synonymous with "comprising at least one", unless otherwise specified.

What is claimed is:

1. A heat-sealable fibrous material for medical packaging, comprising a fibrous single-layer substrate, nonwoven or paper, impregnated to the core with at least one type of a polyurethane and at least one type of a tackifier, the polyurethane having a glass transition temperature of below 10° C.

2. The heat-sealable fibrous material for medical packaging according to claim 1, further comprising the polyurethane having an activation temperature above 25° C.

3. The heat-sealable fibrous material for medical packaging according to claim 1, further comprising the polyurethane dry matter content being between 1% and 25% by weight relative to the total weight of the fibrous packaging material measured at a hygrometry of between 0.5% and 6%.

4. The heat-sealable fibrous material for medical packaging according to claim 1, further comprising at least one cobinding agent or reinforcing agent.

5. The heat-sealable fibrous material for medical packaging according to claim 4, further comprising the cobinding or reinforcing agent being selected from the group consisting of acrylic copolymers of vinyl acetate, styrene acrylic emulsions, styrene butadiene emulsions, and combinations thereof.

6. The heat-sealable fibrous material for medical packaging according to claim 4, wherein a dry matter content of the cobinding or reinforcing agent is between 1% and 15% by weight relative to total weight of the fibrous packaging material measured at a hygrometry of between 0.5% and 6%.

7. The heat-sealable fibrous material for medical packaging according to claim 1, further comprising the tackifier being chosen from the group consisting of ethylene acrylic acid copolymers, terpene derivatives, and combinations thereof.

8. The heat-sealable fibrous material for medical packaging according to claim 1, wherein a dry matter content of the tackifier is less than 15% by weight relative to total weight of the fibrous packaging material measured at a hygrometry of between 0.5% and 6%.

9. The heat-sealable fibrous material for medical packaging according to claim 1, further comprising a functional additive being present in a content of between 0.1% and 7% relative to the total weight of the fibrous packaging material measured at a hygrometry of between 0.5% and 6%.

10. The heat-sealable fibrous material for medical packaging according to claim 9, further comprising the functional additive being chosen from a group consisting of modified polyvinyl alcohols, unmodified polyvinyl alcohols, sizing agents, carboxymethylcelluloses, antifoams, starches, inorganic fillers, pigments, substances impermeable to fats and lipids having a low surface tension, and compounds capable of adjusting pH.

11. The heat-sealable fibrous material for medical packaging according to claim 1, further comprising at least one copolymer of ethylene acrylic acid containing between 10% and 30% of acrylic acid by weight and having a melting point above 60° C., and at least one polyvinyl alcohol, an aqueous 4% by weight solution of the polyvinyl alcohol having a viscosity of less than 6 mPa·s at 23° C. and a degree of hydrolysis of greater than 95%.

12. The heat-sealable fibrous material for medical packaging according to claim 1, wherein the nonwoven fibrous substrate comprises natural fibers, synthetic fibers, or a combination thereof.

13. The heat-sealable fibrous material for medical packaging according to claim 1, wherein the heat-sealable fibrous material has a seal strength greater than 100 cN/15 mm.

14. A packaging for medical use comprising a fibrous material for medical packaging which is heat-sealable as claimed in claim 1.

15. The heat sealable fibrous material of claim 1, wherein the at least one polyurethane comes from a sizing composition in the form of an aqueous dispersion of polyurethane particles.

* * * * *